United States Patent
Petrik et al.

(10) Patent No.: US 9,023,297 B2
(45) Date of Patent: May 5, 2015

(54) METHOD AND SYSTEM FOR PRODUCING MONOSILANE

(75) Inventors: Adolf Petrik, Freudenstadt (DE); Christian Schmid, Freudenstadt (DE); Jochem Hahn, Rottenburg (DE)

(73) Assignee: Schmid Silicon Technology GmbH (DE)

( * ) Notice: Subject to any disclaimer, the term of this patent is extended or adjusted under 35 U.S.C. 154(b) by 640 days.

(21) Appl. No.: 13/382,557

(22) PCT Filed: Jul. 7, 2010

(86) PCT No.: PCT/EP2010/059748
§ 371 (c)(1),
(2), (4) Date: Apr. 26, 2012

(87) PCT Pub. No.: WO2011/003949
PCT Pub. Date: Jan. 13, 2011

(65) Prior Publication Data
US 2012/0201728 A1     Aug. 9, 2012

(30) Foreign Application Priority Data
Jul. 8, 2009  (DE) .......................... 10 2009 032 833

(51) Int. Cl.
*B01J 8/04*     (2006.01)
*B01J 8/00*     (2006.01)
(Continued)

(52) U.S. Cl.
CPC .............. *B01D 3/009* (2013.01); *C01B 33/043* (2013.01)

(58) Field of Classification Search
CPC .............. B01J 8/00; B01J 8/02; B01J 8/0285; B01J 19/00; B01J 19/24; B01J 35/00; B01J 35/02; B01J 2219/00; B01J 2219/00002; B01J 8/04; B01D 3/00; B01D 3/009; C01B 33/00; C01B 33/04; C01B 33/043
USPC .................. 422/129, 187, 211, 600, 608, 610, 422/630–634, 644, 646; 423/324, 341, 342, 423/344, 347; 203/28, 29
See application file for complete search history.

(56) References Cited

U.S. PATENT DOCUMENTS 3,968,199 A    7/1976  Bakay
4,113,845 A *  9/1978  Litteral ......................... 423/342
(Continued)

FOREIGN PATENT DOCUMENTS

CA    1145-117 A    4/1983
CA    1 210 220 A   8/1986
(Continued)

OTHER PUBLICATIONS

Machine translation of RU2152902 (C2), provided in IDS filed Sep. 10, 2014 and published Jul. 20, 2000.*
(Continued)

*Primary Examiner* — Natasha Young
(74) *Attorney, Agent, or Firm* — DLA Piper LLP (US)

(57) ABSTRACT

A plant for preparing monosilane ($SiH_4$) by catalytic disproportionation of trichlorosilane ($SiHCl_3$) includes a reaction column having a feed line for trichlorosilane and a discharge line for silicon tetrachloride (SiCl4) formed, and at least one condenser via which monosilane produced can be discharged from the reaction column, wherein the reaction column has at least two reactive/distillative reaction regions operated at different temperatures and containing different catalytically active solids, at least one of the reaction regions containing a catalytically active solid based on vinylpyridine, and at least one of the reaction regions containing a catalytically active solid based on styrene.

11 Claims, 1 Drawing Sheet

(51) Int. Cl.

| | |
|---|---|
| *B01J 8/02* | (2006.01) |
| *B01J 19/00* | (2006.01) |
| *B01J 19/24* | (2006.01) |
| *B01J 35/00* | (2006.01) |
| *B01J 35/02* | (2006.01) |
| *B01D 3/00* | (2006.01) |
| *C01B 33/00* | (2006.01) |
| *C01B 33/04* | (2006.01) |

(56) References Cited

U.S. PATENT DOCUMENTS

| | | | |
|---|---|---|---|
| 4,610,858 A * | 9/1986 | Yamada et al. | 423/342 |
| 4,613,489 A | 9/1986 | Morimoto | |
| 4,676,967 A * | 6/1987 | Breneman | 423/347 |
| 6,905,576 B1 | 6/2005 | Block et al. | |
| 2002/0177741 A1 | 11/2002 | Allison et al. | |
| 2004/0091412 A1 | 5/2004 | Müller et al. | |

FOREIGN PATENT DOCUMENTS

| | | |
|---|---|---|
| DE | 25 07 864 A1 | 8/1975 |
| DE | 29 19 086 A1 | 3/1980 |
| DE | 33 11 650 A1 | 10/1983 |
| DE | 34 12 705 A1 | 2/1985 |
| DE | 198 60 146 A1 | 6/2000 |
| DE | 100 17 168 A1 | 10/2001 |
| RU | 2 152 902 | 7/2000 |

OTHER PUBLICATIONS

Russian Inquiry dated Jun. 24, 2014 along with its English translation from corresponding Russian Patent Application No. 2012102501/05(003644).

* cited by examiner

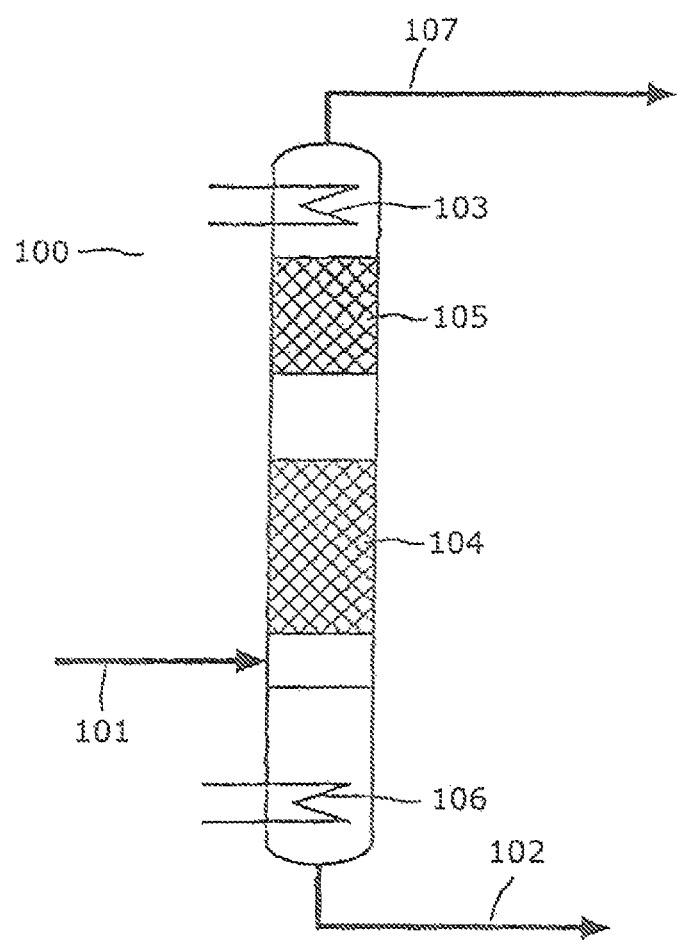

METHOD AND SYSTEM FOR PRODUCING MONOSILANE

RELATED APPLICATIONS

This is a §371 of International Application No. PCT/EP2010/059748, with an international filing date of Jul. 7, 2010 (WO 2011/003949 A1, published Jan. 13, 2011), which is based on German Patent Application No. 10 2009 032 833.5, filed Jul. 8, 2009, the subject matter of which is incorporated by reference.

TECHNICAL FIELD

This disclosure relates to a plant for preparing monosilane ($SiH_4$), which comprises a reaction column having a feed line for trichlorosilane and a discharge line for silicon tetra-chloride ($SiCl_4$) formed and also at least one condenser via which the monosilane produced can be discharged from the reaction column. Furthermore, the disclosure relates to a process for preparing monosilane by catalytic disproportionation of trichlorosilane.

BACKGROUND

High-purity silicon is generally produced in a multistage process starting from metallurgical silicon which can have a relatively high proportion of impurities. To purify the metallurgical silicon, this can, for example, be converted into a trihalosilane such as trichlorosilane ($SiHCl_3$) which is subsequently thermally decomposed to give high-purity silicon. Such a procedure is known, for example, from DE 29 19 086. As an alternative thereto, high-purity silicon can also be obtained by thermal decomposition of monosilane, as described, for example, in DE 33 11 650. Monosilane can be obtained, in particular, by disproportionation of trichlorosilane. The latter can in turn be prepared, for example, by reaction of metallurgical silicon with silicon tetrachloride and hydrogen.

To accelerate the disproportionation, it is possible to use catalysts. Basic catalysts such as the amine compounds known from DE 25 07 864 and derivatives have been found to be particularly useful. These are preferably used in bound form, as described, for example, in DE 33 11 650. Catalysts bound to solid supports can be separated in a simple manner from liquid or gaseous reaction mixtures. In the case of amine compounds, introduction of contaminated amines into the silane/chlorosilane mixture can be avoided in this way. Owing to the associated advantage, virtually only amine catalysts immobilized on supports or amine catalysts incorporated into crosslinked polymers are nowadays used in the industrial disproportionation of trichlorosilane.

It is known from, inter alia, DE 198 60 146 that disproportionation of trichlorosilane can be allowed to proceed according to the principle of reactive distillation. Reactive distillation is characterized by a combination of reaction and separation by distillation in one apparatus, in particular in a column. In this apparatus, the lowest-boiling component is continually removed by distillation, with maintenance of an optimal difference between equilibrium state and actual content of low-boiling components or lowest-boiling component always being strived for in each volume element of the apparatus.

The advantages of reactive distillation can be combined with the advantages of catalyzed reaction of trichlorosilane. This can be achieved by carrying out the disproportionation, for example, of trichlorosilane into silicon tetrachloride and monosilane, in a column in which the packings (packing elements, internals, etc.) which make mass transfer possible are combined with catalytically active solids. In particular, such a column can contain a catalytically active solid as packing elements.

It is naturally necessary to take into account the thermal stability of the catalytically active packing elements used. In general, these are based on polystyrene-divinylbenzene resins which are commercially available and relatively inexpensive but become unstable at temperatures just above 100° C. In principle, disproportionation of trichlorosilane can be accelerated to a greater degree with higher reaction temperatures. In practice, however, a compromise has to be made because of the limited thermal stability of the catalyst.

It could therefore be helpful to develop and improve known processes for disproportionation of trichlorosilane, in particular in respect of the rate of the reaction of trichlorosilane.

SUMMARY

We provide a plant for preparing monosilane ($SiH_4$) by catalytic disproportionation of trichlorosilane ($SiHCl_3$) including a reaction column having a feed line for trichlorosilane and a discharge line for silicon tetrachloride ($SiCl_4$) formed, and at least one condenser via which monosilane produced can be discharged from the reaction column, wherein the reaction column has at least two reactive/distillative reaction regions operated at different temperatures and containing different catalytically active solids, at least one of the reaction regions containing a catalytically active solid based on vinylpyridine, and at least one of the reaction regions containing a catalytically active solid based on styrene.

We also provide a process for preparing monosilane ($SiH_4$) by catalytic disproportionation of trichlorosilane ($SiHCl_3$), including causing disproportionation in at least two reactive/distillative reaction regions operated at different temperatures and containing different catalytically active solids, wherein at least one of the reaction regions contains a catalytically active solid based on vinylpyridine and at least one of the reaction regions contains a catalytically active solid based on styrene.

BRIEF DESCRIPTION OF THE DRAWING

FIG. 1 schematically shows the reaction column of our plant for preparing monosilane.

DETAILED DESCRIPTION

In our plant for preparing monosilane, monosilane is prepared by catalytic disproportionation of trichlorosilane as in almost all plants of this type. The plant always comprises at least one reaction column which has a feed line for trichlorosilane and a discharge line for the silicon tetrachloride formed in the disproportionation. The plant further comprises at least one condenser via which the monosilane or monosilane-containing product mixture produced can be discharged from the reaction column.

The at least one reaction column is particularly preferably characterized in that it has at least two reactive/distillative reaction regions operated at different temperatures and containing different catalytically active solids.

The principle of reactive distillation has already been mentioned at the outset. This principle is also used in the reaction column of our plant for preparing monosilane. Thus, a reaction proceeds in each of the reactive/distillative reaction regions with continual discharge of the low boilers. These can then be transferred to a downstream reactive/distillative reaction region for further reaction or else they are fed directly to the at least one condenser mentioned (whose function will be described in more detail below).

Our plant can comprise one or more of the reaction columns mentioned. It is completely conceivable that, for example, two or more of the reaction columns are connected in parallel within a plant to multiply the speed of the disproportionation accordingly.

In general, the at least one reaction column in our plant is aligned vertically so that the reactive/distillative reaction regions operated at different temperatures are arranged one above the other. Within the reaction column, the temperature preferably decreases in an upward direction so that a reactive/distillative reaction region located higher up is generally operated at a lower temperature than a region underneath. In general, the reaction column is heated only at its lower end. The lowest reactive/distillative reaction region in a reaction column accordingly usually has the highest operating temperature.

A decisive advantage of our plant compared to known plants is that, as mentioned above, not only one catalytically active solid, but at least two different catalytically active solids are used. Each of the solids can be selected so that it is matched to a very particular operating temperature. Preference is thus given to a thermally more stable solid to be used as a catalyst in a reactive/distillative reaction region located lower down than in a reaction region located higher up. The reaction column in our plant can accordingly all be operated at a higher temperature than known plants. The disproportionation rate may correspondingly be significantly higher.

Particular preference is given to at least one of the reactive/distillative reaction regions of the reaction column of a plant having a catalytically active solid based on vinylpyridine or a vinylpyridine derivative. The solid is particularly preferably based on a copolymer with divinylbenzene, i.e., in particular on a vinylpyridine-divinylbenzene copolymer. A suitable catalytically active vinylpyridine-divinylbenzene copolymer is described, for example, in U.S. Pat. No. 4,613,489.

However, as an alternative to vinylpyridine, it is also possible to use other nitrogen-containing heterocycles, including, in particular, polyvinylpyrrolidone, polyvinylpyrrolidine, copolymers of vinylpyrrolidone and vinylpyrrolidine with divinylbenzene and derivatives thereof.

All these compounds have a multiply bonded nitrogen atom and generally remain thermally stable even at temperatures of up to 200° C.

At least one of the reactive/distillative reaction regions of the reaction column preferably contains a catalytically active solid based on styrene or a styrene derivative, in particular based on a styrene-divinylbenzene copolymer. As mentioned at the outset, such resins are commercially available and relatively inexpensive, but can be used only at limited temperatures. In our reaction column, they are therefore preferably used in a reaction region preceded by a further reaction region filled with a comparatively more heat-resistant resin.

The catalytic activity of the resins based on styrene or based on styrene-divinylbenzene copolymers is due to the presence of amine groups, in particular tertiary and quaternary amine groups, in the resins. Polystyrene-divinylbenzene resins having tertiary amine groups can be obtained by various methods which in each case lead to products having identical formulae (see Ullmanns Enzyklopädie der technischen Chemie, 4th edition, volume 13, Weinheim 1997, pages 301-303). Purely by way of example, mention may be made of the phthalimide process in this context. In this, a divinylbenzene-crosslinked polystyrene resin is reacted with phthalimide or a phthalimide derivative. After hydrolysis of the product obtained, viz. a primary polyvinylbenzylamine, this is reacted with formaldehyde and formic acid. Thus, the desired catalyst is obtained in the form of a polystyrene resin having tertiary amino groups.

Particularly preferably, our plant has, in accordance with what has been said above, a reaction column which
- has at least one reaction region which is at least partly filled with a catalytically active solid based on vinylpyridine or a vinylpyridine derivative, in particular a vinylpyridine-divinylbenzene copolymer, and
- has at least one reaction region which is filled with a catalytically active solid based on styrene or a styrene derivative, in particular on the basis of a styrene-divinylbenzene copolymer, wherein the at least one reaction region containing the catalytically active solid based on vinylpyridine or the vinylpyridine derivative is arranged below the at least one reaction region containing the catalytically active solid based on styrene or the styrene derivative.

The lower reaction regions of the column are accordingly able to withstand higher temperatures than the upper reaction regions. The temperature decreases towards the top and here it is possible to use the cheap ion-exchange resins based on the styrene-divinylbenzene copolymer mentioned.

As mentioned above, both a reaction and a continuous removal of low boilers (i.e., the monosilane-containing fraction) by distillation takes place in each of the reaction regions. The low boilers can then be transferred to downstream reactive/distillative reaction regions so that the concentration of monosilane in a column generally increases in an upward direction. From the last or uppermost reaction region in a column, the silane-containing product mixture is then fed to a condenser which is generally operated so that either only monosilane or a monosilane-containing fraction having very low proportions of further volatile components can pass through. Chlorine-containing silanes should if possible be held back in the reaction column by the condenser. For this reason, the condenser is, preferably, integrated into the top of the reaction column. However, it is also possible in principle to use a separate condenser located down-stream of the column. The chlorosilanes separated off in such a condenser can be returned to the reaction column via a return line.

Our plant can naturally also have a plurality of condensers connected in parallel and/or in series.

In a manner analogous to what has been said above, trichlorosilane is also catalytically disproportionated in the process for preparing monosilane, with the disproportionation being carried out in at least two reactive/distillative reaction regions which are operated at different temperatures and contain different catalytically active solids. The process is particularly preferably carried out in a plant as has been described above. Correspondingly, what has been said above in respect of the catalytically active solids which can be used may be referred to in full and is incorporated by reference.

As mentioned above, the catalysts based on vinylpyridine can generally be used at higher temperatures than the catalysts based on styrene. In our process, the reaction regions containing the catalytically active solid based on vinylpyridine or the vinylpyridine derivative, in particular the vinylpyridine-divinylbenzene copolymer, are preferably operated at temperatures in the range from 50° C. to 100° C.

Analogously, the reaction region or regions containing the catalytically active solid based on styrene or a styrene derivative, in particular, a solid based on a styrene-divinylbenzene copolymer, is/are preferably operated at temperatures in the range from 50° C. to 100° C.

The pressure in the reaction regions is generally set to a pressure in the range from 0.1 bar to 20 bar.

The operating temperature of the condenser mentioned is preferably in the range from −20° C. to −100° C.

Further features may be derived from the following description of preferred examples. Individual features can in each case be realized on their own or as a combination of a plurality thereof, in an example. Preferred systems and methods described serve merely for the purposes of illustration and for better understanding and are not to be construed as having any limiting effect.

FIG. 1 shows the reaction column 100 in which trichlorosilane can be reacted under disproportionating conditions. Trichlorosilane can be fed in via the feed line 101. The reaction column has a heated region 106 in which the energy required for disproportionation of the trichlorosilane is provided. The actual reaction occurs in the reaction regions 104 and 105. Catalytically active solids are present in each of the two reaction regions. The reaction region 104 is filled with catalytically active particles composed of a vinylpyridine-divinylbenzene copolymer, while the reaction region 105 is filled with a commercially available ion-exchange resin based on a styrene-divinylbenzene copolymer having tertiary amino groups (Amberlyst 21 from Rohm & Haas). Trichlorosilane introduced into the column via the feed line 101 is thus reacted in a first step in the reaction region 104 to form a monosilane-containing product mixture which can go into the reaction region 105. Conversely, disproportionation products having a greater density and a higher boiling point (tetrachlorosilane) travel downwards. A second, further disproportionation can occur in the reaction region 105, resulting in the proportion of monosilane in the reacted reaction mixture increasing further. The condenser 103 which is integrated into the top of the reaction column 100 is operated at a temperature below the condensation point of monochlorosilane, so that essentially only monosilane can pass through the condenser. The condenser accordingly acts as a partial condenser which in the ideal case only allows monosilane to pass through. Chlorine-containing silanes are generally held back in the reaction column by the condenser. Monosilane can be discharged via the discharge line 107. At the lower end of the column, tetrachlorosilane which accumulates can be discharged via the discharge line 102.

The invention claimed is:

1. A plant for preparing monosilane ($SiH_4$) by catalytic disproportionation of trichlorosilane ($SiHCl_3$) comprising:
   a reaction column having a feed line for trichlorosilane and a discharge line for silicon tetrachloride ($SiCl_4$) formed; and
   at least one condenser via which monosilane produced can be discharged from the reaction column,
wherein the reaction column has at least two reactive/distillative reaction regions operated at different temperatures and containing different catalytically active solids, at least one of the reaction regions containing a catalytically active solid based on vinylpyridine, at least one of the reaction regions containing a catalytically active solid based on styrene, the reaction column is aligned vertically so that the reaction regions operated at different temperatures are arranged one above the other, and the at least one reaction region containing the catalytically active solid based on vinylpyridine is arranged below the at least one reaction region containing the catalytically active solid based on styrene.

2. The plant according to claim 1, wherein within the column the temperature decreases in an upward direction so that a reaction region located higher up is operated at a lower temperature than a reaction region located underneath.

3. The plant according to claim 1, wherein at least one reaction region contains a catalytically active solid based on a vinylpyridine-divinylbenzene copolymer.

4. The plant according to claim 1, wherein at least one reaction region contains a catalytically active solid based on a styrene-divinylbenzene copolymer.

5. The plant according to claim 1, wherein the condenser is integrated into a top portion of the reaction column.

6. A process for preparing monosilane ($SiH_4$) by catalytic disproportionation of trichlorosilane ($SiHCl_3$), comprising causing disproportionation in at least two reactive/distillative reaction regions operated at different temperatures and containing different catalytically active solids, wherein at least one of the reaction regions contains a catalytically active solid based on vinylpyridine and at least one of the reaction regions contains a catalytically active solid based on sytrene.

7. The process according to claim 6, wherein it is carried out in a plant comprising:
   a reaction column having a feed line for trichlorosilane and a discharge line for silicon tetrachloride ($SiCl_4$) formed; and
   at least one condenser via which monosilane produced can be discharged from the reaction column,
wherein the reaction column has at least two reactive/distillative reaction regions operated at different temperatures and containing different catalytically active solids, at least one of the reaction regions containing a catalytically active solid based on vinylpyridine, and at least one of the reaction regions containing catalytically active solid based on styrene.

8. The process according to claim 7, wherein the reaction region containing the catalytically active solid based on vinylpyridine is operated at temperatures of 50° C. to 200° C.

9. The process according to claim 7, wherein the reaction region containing the catalytically active solid based on styrene is operated at temperatures of 50° C. to 100° C.

10. The process according to claim 7, wherein the condenser is operated at a temperature of −20° C. to −100° C.

11. The process according to claim 6, wherein pressure in the reaction regions is 0.1 bar to 20 bar.

* * * * *